United States Patent
Jasti et al.

(10) Patent No.: US 7,369,777 B2
(45) Date of Patent: May 6, 2008

(54) METHOD AND APPARATUS FOR AUTOMATICALLY ADJUSTING THE OPTICAL POWER DIRECTED TO A DISPERSION COMPENSATING ELEMENT

(75) Inventors: Chandra Sekhar Jasti, Cupertino, CA (US); Hermann Gysel, San Jose, CA (US); Mani Ramachandran, San Jose, CA (US)

(73) Assignee: General Instrument Corporation, Horsham, PA (US)

( * ) Notice: Subject to any disclaimer, the term of this patent is extended or adjusted under 35 U.S.C. 154(b) by 588 days.

(21) Appl. No.: 10/718,073

(22) Filed: Nov. 20, 2003

(65) Prior Publication Data
US 2005/0111847 A1     May 26, 2005

(51) Int. Cl.
*H04B 10/12*     (2006.01)

(52) U.S. Cl. ............. 398/147; 398/148; 398/149; 398/158; 398/159; 398/79; 398/81; 398/25; 398/26; 398/27; 398/28; 398/29; 398/33; 398/38; 385/24; 385/37; 385/11; 385/27; 385/31

(58) Field of Classification Search ............ 398/147, 398/148, 149, 158, 159, 79, 81, 25, 26, 27, 398/28, 29, 33, 38; 385/24, 37, 27, 11, 31
See application file for complete search history.

(56) References Cited

U.S. PATENT DOCUMENTS

| | | | |
|---|---|---|---|
| 5,963,361 A * | 10/1999 | Taylor et al. | 359/337 |
| 6,654,561 B1 * | 11/2003 | Terahara et al. | 398/26 |
| 6,724,526 B1 * | 4/2004 | Onaka et al. | 359/337.1 |
| 6,728,026 B2 * | 4/2004 | Lee et al. | 359/337.11 |
| 6,778,321 B1 * | 8/2004 | Islam | 359/334 |
| 2002/0071173 A1 * | 6/2002 | Lee et al. | 359/337.1 |
| 2004/0223769 A1 * | 11/2004 | Hoshida | 398/188 |

* cited by examiner

*Primary Examiner*—Hanh Phan
(74) *Attorney, Agent, or Firm*—Larry T. Cullen

(57) ABSTRACT

A dispersion compensator is provided that includes an input port 102 for receiving a WDM optical signal and a dispersion compensating element 110 coupled to the input port for substantially compensating the WDM optical signal for dispersion that has accumulated along an external transmission path. The dispersion compensator also includes an output port 104 for directing the dispersion compensated WDM optical signal to an external element and a dynamic power controller 106, 108, 112, 114, 116 for maintaining a total power of the WDM signal below a prescribed level prior to receipt of the WDM optical signal by the dispersion compensating element.

18 Claims, 3 Drawing Sheets

METHOD AND APPARATUS FOR AUTOMATICALLY ADJUSTING THE OPTICAL POWER DIRECTED TO A DISPERSION COMPENSATING ELEMENT

FIELD OF THE INVENTION

The present invention relates generally to WDM optical transmission systems, and more particularly to a method and apparatus for providing dispersion compensation in a WDM optical transmission system.

BACKGROUND OF THE INVENTION

In recent years, Wavelength Division Multiplexed (WDM) and Dense Wavelength Division Multiplexed (DWDM) optical transmission systems have been increasingly deployed in optical networks. Although DWDM optical transmission systems have increased the speed and capacity of optical networks, the performance of such systems, especially those providing high bit rates, has traditionally been limited by various factors such as chromatic dispersion and the non-linearity in an optical fiber's refractive index, which can cause spectral broadening of optical pulses and degrade the transmission of high speed optical signals. Because such optical signal degradation tends to accumulate along transmission paths, chromatic dispersion and non-linearity can significantly limit the transmission distance of high speed optical signals.

Chromatic dispersion refers to the fact that different wavelengths of light pass through an optical fiber at different speeds, thereby causing a pulse of light propagating through the optical fiber to broaden. Chromatic dispersion is an inherent property of the glass fiber and arises from two sources, the material properties of the glass and the waveguide structure (i.e., the refractive index profile of the glass fiber). For example, a single mode fiber through which light propagates at a wavelength of 1550 nm operates in the so-called anomalous dispersion regime. In the anomalous dispersion regime longer wavelengths (i.e. lower frequencies) of light travel at slower speeds than shorter wavelengths (i.e. higher frequencies) of light. As a result, the different wavelengths in pulse of light will be broadened as it travels through the single mode optical fiber.

Several solutions have been proposed to mitigate the effects of dispersion in transmission fibers. One technique involves the use of a compensating optical fiber having an appropriate length and which has a dispersion that is opposite to the dispersion characteristic of the transmission fiber. As a result, the dispersion in the transmission fiber is substantially canceled by the total dispersion in the compensating fiber. The dispersion of the compensating fiber is generally selected to be much greater in magnitude than the dispersion of the transmission fiber. In this way the length of the dispersion compensating fiber may be much less than the length of the transmission fiber. For example, to compensate for dispersion in a single mode fiber 100 km in length, a typical dispersion compensating fiber may need to be about 10 km in length. Such fiber is generally wound on a mandrel and provided for use as a dispersion compensating module.

Since high dispersion fiber has a relatively small core area (e.g., about 25 $\mu m^2$ for a −100 ps/nm-km fiber), the optical power density in the dispersion compensating fiber will be relatively high, which leads to signal degradation arising from non-linear interactions. Accordingly, there is limit to the optical power that can be directed into the dispersion compensating fiber if nonlinear penalties are to be avoided. For example, it has been determined that a safe power level for light launched into one common dispersion compensating fiber is about 0 dBm/wavelength. Thus, for a WDM system employing 40 channels or wavelengths, the maximum permissible power that can be launched into the dispersion compensating fiber while avoiding non-linear penalties is about 16 dBm.

In many cases WDM networks are often initially deployed at less than their maximum capacity. That is, a system designed to transmit 40 channels or more, for instance, initially may be more lightly loaded with only 2, 4, or 8 channels. As demand increases, network capacity can be increased by increasing the number of wavelengths that are used. In addition, the number of wavelengths that are used may be changed dynamically as demand increases or decreases. Such dynamic networks will need to dynamically control the input power to the dispersion compensating fiber to avoid nonlinearities.

Accordingly, it would be desirable to provide a method and apparatus for automatically adjusting the optical power directed to a dispersion compensating fiber so that nonlinear interactions are avoided.

SUMMARY OF THE INVENTION

In accordance with the present invention, a dispersion compensator is provided that includes an input port for receiving a WDM optical signal and a dispersion compensating element coupled to the input port for substantially compensating the WDM optical signal for dispersion that has accumulated along an external transmission path. The dispersion compensator also includes an output port for directing the dispersion compensated WDM optical signal to an external element and a dynamic power controller for maintaining a total power of the WDM signal below a prescribed level prior to receipt of the WDM optical signal by the dispersion compensating element.

In accordance with one aspect of the invention, the prescribed level below which the total power of the WDM optical signal is to be maintained is sufficient to substantially avoid non-linear interactions in the dispersion compensating element.

In accordance with another aspect of the invention, the dynamic power controller includes a variable optical attenuator (VOA) located at a point intermediate to the input port and the dispersion compensating element and a control arrangement for adjusting attenuation of the VOA based on a measured power level of the WDM optical signal.

In accordance with another aspect of the invention, the control arrangement includes a first optical tap located at a point intermediate to the input port and the dispersion compensating element for receiving a portion of the WDM optical signal and a controller for adjusting the attenuation of the VOA based on the received portion of the WDM optical signal.

In accordance with another aspect of the invention, the control arrangement further includes an optical tunable filter coupled to the first optical tap for receiving a portion of the WDM optical signal therefrom. The control arrangement also includes a first photodetector coupled to the optical tunable filter for generating a first reference signal in response to the portion of the WDM optical signal received from the optical tunable filter. The first reference signal is directed to the controller.

In accordance with another aspect of the invention, the first optical tap is located at a point intermediate to the input port and the VOA.

In accordance with another aspect of the invention, the dispersion compensator further includes a second optical tap located at a point intermediate to the VOA and the dispersion compensating element for receiving a portion of the attenuated WDM optical signal. A second photodetector is coupled to the second optical tap for generating a second reference signal in response to the received portion of the attenuated WDM optical signal. A comparator is also provided that has inputs receiving the second reference signal and a control signal provided by the controller. The comparator has an output for providing a drive signal to the VOA for adjusting the attenuation thereof.

In accordance with another aspect of the invention, the dispersion compensator further includes an optical splitter having an input coupled to the first optical tap and a first output coupled to the tunable filter. A third photodetector is coupled to a second output of the optical splitter for generating a third reference signal representative of a total power level of the WDM optical signal received at the input port. The third reference signal is provided to the controller.

In accordance with another aspect of the invention, the dispersion compensator further includes an optical splitter having an input coupled to the first optical tap and a first output coupled to the tunable filter. A second photodetector is coupled to a second output of the optical splitter for generating a third reference signal representative of a total power level of the WDM optical signal after traversing the VOA. The second reference signal is provided to the controller.

In accordance with another aspect of the invention, a method provides dispersion compensation to a WDM optical signal. The method begins by receiving the WDM optical signal and maintaining a total power of the WDM signal below a prescribed level. The WDM signal is then directed to a dispersion compensating element. The WDM optical signal is substantially compensated for dispersion that has accumulated along an external transmission path and the resulting dispersion compensated WDM optical signal is directed to an external element.

DETAILED DESCRIPTION

Figure 1:
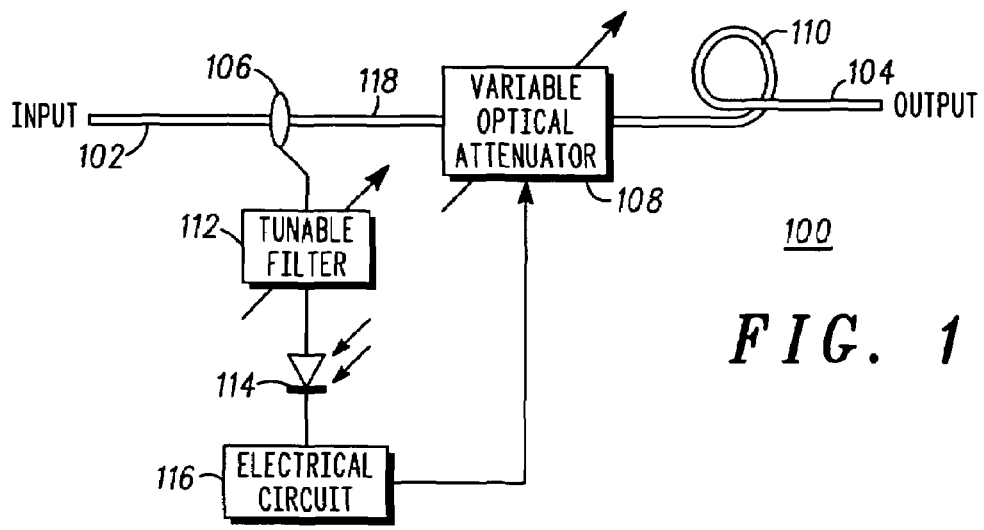
FIG. 1 shows one embodiment of a dispersion compensating module constructed in accordance with the present invention.

FIG. 1 shows one embodiment of a dispersion compensating module 100 constructed in accordance with the present invention. The dispersion compensating module 100 is a two port device having an input port 102 and an output port 104. Dispersion compensating module 100 is designed to be inserted along an optical transmission path to reduce or eliminate the dispersion accumulated by a WDM optical signal as it traverses the optical transmission path.

The dispersion compensating module 100 includes a dispersion compensating element 110 such as a single mode optical fiber. Dispersion compensating element 110 provides an amount of dispersion that is opposite to the dispersion accumulated by the WDM optical signal along all or part of the transmission path. A dynamic power controller, described in detail below, controls the total input power to the dispersion compensating element 110 so that the power level of the WDM optical signal traversing the dispersion compensating element 110 does not exceed a predetermined threshold above which nonlinear interactions become a significant source of impairment.

The dynamic power controller includes an optical tap 106 that is located along the optical path 118 between the input port 102 and the dispersion compensating element 110 to receive a small portion of the optical power that is directed to the input port 102. The optical power received by the tap 106 is directed to a tunable filter 112. The tunable filter 112 can be tuned over the entire wavelength band occupied by the WDM optical signal that is received at the input port 102. For example, if the WDM signal is located in the C band that encompasses wavelengths between 1525 and 1565 nm, then the tunable filter 112 can tuned over this same range. The output from the tunable filter 112 is directed to a first photodiode 114, which generates an electrical reference signal in response thereto. The reference signal represents the power level of the incoming WDM optical signal received at the input port 102 at a particular wavelength or channel. The electrical reference signal is directed to a controller 116. A variable optical attenuator (VOA) 108 is provided along the optical path 118 between the tap 106 and the dispersion compensating element 110. The VOA 108 provides a selected amount of attenuation to the optical signal received from the input port 102 of the module 100. The amount of attenuation that is provided is determined by a control signal received from the controller 116.

VOAs are well known in the art and VOA 108 may be any device that can provide variable attenuation to an optical signal. For example, the VOA may be formed from a filter that has an effective filter region located in an optical path between a collimator and a reflector. The filter has a filter density which increases from a low density region to a high density region. An optical signal can be attenuated to different extents by transmitting through different regions of the filter. VOAs are generally of two fundamental types, mechanical and non-mechanical. The mechanical VOA have moving parts such as stepper motors to adjust the filter to vary the attenuation. In non-mechanical VOAs, the mechanism employed to adjust the attenuation is either a magneto-optic effect or thermo-optic effect that modifies the light waveguide. The attenuation settings of a non-mechanical VOA are generally wavelength dependent. Mechanical VOAs on the other hand adjust the optical attenuation in a manner that provides relative independence of wavelength.

As the optical tunable filter 112 seen in FIG. 1 is swept across its waveband, the reference signal generated by the first photodiode 114 will go through peaks that correspond to the location of a channel and troughs that correspond to locations between channels. The number of channels employed in the input WDM signal corresponds to the number of peaks in the reference signal. In this way the controller 116 can determine the total number of channels in the WDM signal. The controller 116 can also integrate the reference signal received from the first photodiode 114 at each of the channel wavelengths to determine the total power level of the WDM signal. Given the total power level of the WDM signal and the number of channels in the WDM signal, the controller 116 can determine the maximum power level of the WDM signal that should not be exceeded to avoid nonlinear penalties. The control signal generated by the controller 116 adjusts the VOA 108 so that it provides the level of attenuation necessary to reduce the total power of the WDM signal to this maximum power level. As previously mentioned, for some dispersion compensating elements the power level should be kept below about 0 db/wavelength.

Figure 2:
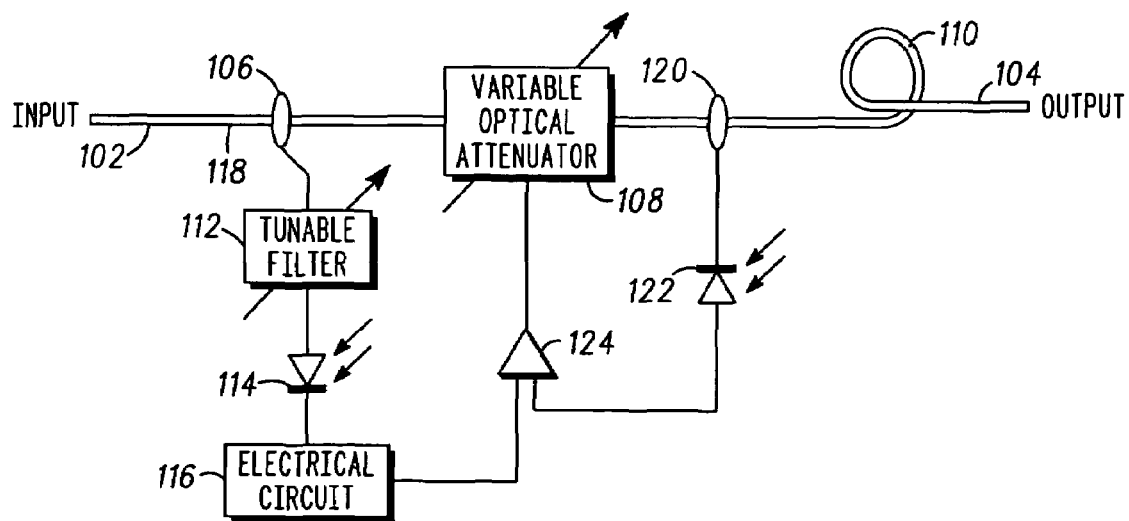
FIG. 2 shows an alternative embodiment of the invention in which the dynamic controller operates in a closed loop configuration.

In the embodiment of the invention shown in FIG. 1 the dynamic controller operates in an open loop configuration in which the power level directed to the dispersion compensating element 110 is determined only by the power level of the incoming WDM signal received at the input port 102. In this case the controller 116 is referred to as a proportional control circuit. FIG. 2 shows an alternative embodiment of the invention in which the dynamic controller operates in a closed loop configuration that uses both the power level of the optical signal before and after traversing the VOA 108. In FIGS. 1 and 2, as well as the figures that follow, like elements are denoted by like reference numerals.

As shown in FIG. 2, a second optical tap 120 is provided in the optical path 118 between the output of the VOA 108 and the input to the dispersion compensating element 110. The optical power received by the second optical tap 120, which is representative of the power in the WDM signal after it has been attenuated by VOA 108, is directed to a second photodiode 122 that in turn generates a second electrical reference signal in response thereto. The second reference signal and the control signal from the controller 116 are directed to respective inputs of an electrical comparator 124. The electrical comparator 124 generates an electrical drive signal representative of the power differential between the desired power level of the WDM signal after traversing the VOA 108 and its actual power level. The electrical drive signal is used to adjust the attenuation of the VOA 216 so that the actual power level of the WDM signal is more nearly equal to its desired power level.

Figure 3:
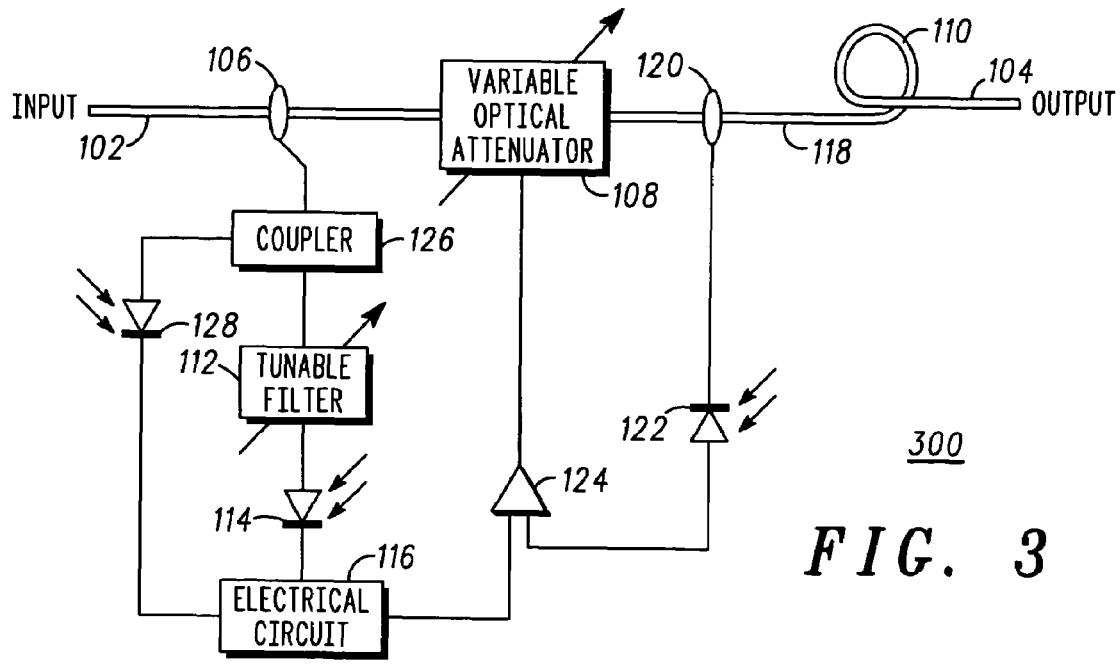
FIGS. 3-5 show other alternative embodiments of the invention.

As in FIG. 1, the controller 116 in the embodiment of the invention in FIG. 2 determines the total number of channels and the total power in the WDM signal by integrating the individual narrow passbands of the tunable filter 112 over its entire waveband. FIG. 3 shows yet another embodiment of the invention in which no such integration is necessary.

The dispersion compensating module 300 shown in FIG. 3 is a closed loop arrangement similar to that depicted in FIG. 2 except that in FIG. 3 the optical output from the tap 106 is split by a 1×2 splitter 126 so that a portion of the output is directed to tunable filter 112, as in FIG. 2, and another portion of the output is directed to a third photodiode 128. The third photodiode 128 generates a third reference signal that represents the total power in the WDM signal received at the input port 102 of the dispersion compensating module 300. As in FIG. 2, the reference signal generated by the first photodiode 114 can be used to determine the number of channels in the WDM signal as the tunable filter 112 is swept across its waveband. Accordingly, the need to integrate the reference signals is avoided.

Figure 4:
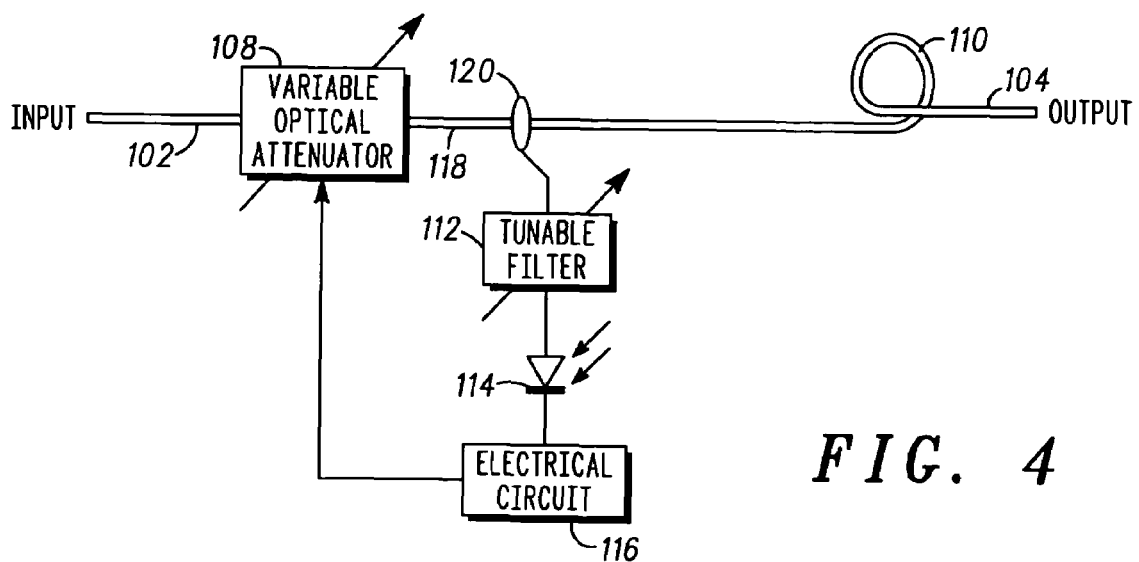

FIG. 4 shows another embodiment of the invention in which the dynamic controller operates in a feedback loop configuration. As shown, a single tap 120 is located along the transmission path 118 between the output of the VOA 108 and the dispersion compensating element 110. The optical power received by the tap 120 is directed to a tunable filter 112. The output from the tunable filter 112 is directed to the first photodiode 114, which generates an electrical reference signal in response thereto. The reference signal represents the power level of the incoming WDM signal at a particular channel or wavelength after it has been attenuated by VOA 108. The electrical reference signal is directed to a controller 116. As in FIG. 1, the controller 116 in the embodiment of the invention in FIG. 4 determines the total number of channels and the total power in the WDM signal by integrating the individual narrow passbands of the tunable filter 112 over its entire waveband.

Figure 5:
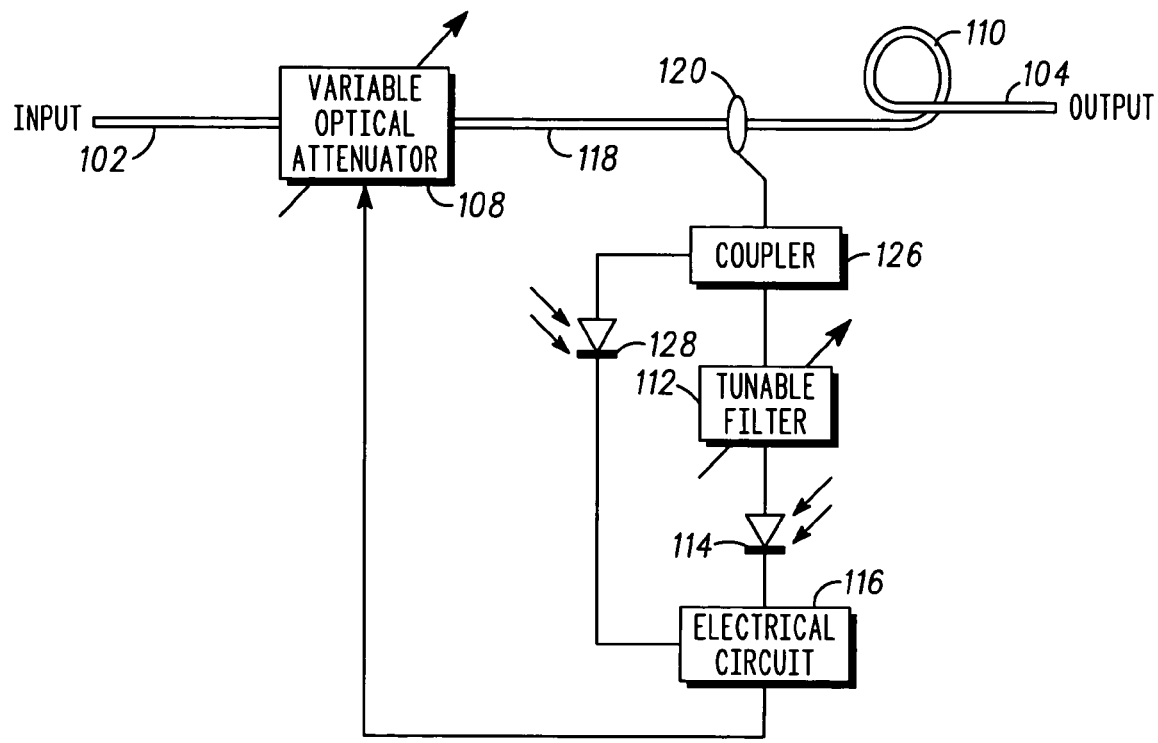

Similar to FIG. 4, FIG. 5 shows another embodiment of the invention in which the dynamic controller operates in a feedback loop configuration. Unlike FIG. 4, however, in FIG. 5 no integration is necessary. The optical output from the tap 120 is split by the 1×2 splitter 126 so that a portion of the output is directed to tunable filter 112 and another portion of the output is directed to the photodiode 128. The photodiode 128 generates a reference signal that represents the total power in the WDM signal after it has been attenuated by VOA 108. As in FIG. 2, the reference signal generated by the first photodiode 114 can be used to determine the number of channels in the WDM signal as the tunable filter 112 is swept across its waveband. Accordingly, the need to integrate the reference signals is once again avoided.

The invention claimed is:

1. A dispersion compensator, comprising:
   an input port for receiving a WDM optical signal;
   a dispersion compensating element coupled to the input port for substantially compensating the WDM optical signal for dispersion that has accumulated along an external transmission path;
   an output port for directing the dispersion compensated WDM optical signal to an external element; and
   a dynamic power controller for maintaining a total power of the WDM signal below a prescribed level prior to receipt of the WDM optical signal by the dispersion compensating element,
   wherein said prescribed level below which the total power of the WDM optical signal is to be maintained is sufficient to substantially avoid non-linear interactions in the dispersion compensating element, and
   said dynamic power controller determines the total number of channels and the total power in said WDM optical signal.

2. The dispersion compensator of claim 1 wherein said dynamic power controller comprises:
   a variable optical attenuator (VOA) located at a point intermediate to the input port and the dispersion compensating element; and
   a control arrangement for adjusting attenuation of the VOA based on a measured power level of the WDM optical signal.

3. A dispersion compensator, comprising:
   an input port for receiving a WDM optical signal;
   a dispersion compensating element coupled to the input port for substantially compensating the WDM optical signal for dispersion that has accumulated along an external transmission path;
   an output port for directing the dispersion compensated WDM optical signal to an external element; and
   a dynamic power controller for maintaining a total power of the WDM signal below a prescribed level prior to receipt of the WDM optical signal by the dispersion compensating element,
   wherein said dynamic power controller comprises:
   a variable optical attenuator (VOA) located at a point intermediate to the input port and the dispersion compensating element; and
   a control arrangement for adjusting attenuation of the VOA based on a measured power level of the WDM optical signal, and
   wherein said dynamic power controller determines the total number of channels and the total power in said WDM optical signal.

4. The dispersion compensator of claim 3, wherein said control arrangement comprises:
- a first optical tap located at a point intermediate to the input port and the dispersion compensating element for receiving a portion of the WDM optical signal; and
- a controller for adjusting the attenuation of the VOA based on said received portion of the WDM optical signal.

5. The dispersion compensator of claim 4, wherein said control arrangement further comprises:
- an optical tunable filter coupled to the first optical tap for receiving a portion of the WDM optical signal therefrom; and
- a first photodetector coupled to the optical tunable filter for generating a first reference signal in response to said portion of the WDM optical signal received from the optical tunable filter, said first reference signal being directed to said controller.

6. The dispersion compensator of claim 5, wherein said first optical tap is located at a point intermediate to the input port and the VOA.

7. The dispersion compensator of claim 6 further comprising:
- a second optical tap located at a point intermediate to the VOA and the dispersion compensating element for receiving a portion of the attenuated WDM optical signal;
- a second photodetector coupled to the second optical tap for generating a second reference signal in response to said received portion of the attenuated WDM optical signal; and
- a comparator having inputs receiving the second reference signal and a control signal provided by the controller and having an output for providing a drive signal to the VOA for adjusting the attenuation thereof.

8. The dispersion compensator of claim 7 further comprising:
- an optical splitter having an input coupled to the first optical tap and a first output coupled to the tunable filter; and
- a third photodetector coupled to a second output of the optical splitter for generating a third reference signal representative of a total power level of the WDM optical signal received at the input port, said third reference signal being provided to said controller.

9. The dispersion compensator of claim 4, wherein said first optical tap is located at a point intermediate to the input port and the VOA.

10. The dispersion compensator of claim 4, wherein said first optical tap is located at a point intermediate to the VOA and the dispersion compensating element.

11. The dispersion compensator of claim 10 further comprising:
- an optical splitter having an input coupled to the first optical tap and a first output coupled to a tunable filter; and
- a second photodetector coupled to a second output of the optical splitter for generating a third reference signal representative of a total power level of the WDM optical signal after traversing the VOA, said second reference signal being provided to said controller.

12. A method for providing dispersion compensation to a WDM optical signal, said method comprising the steps of:
- receiving the WDM optical signal;
- maintaining a total power of the WDM signal below a prescribed level;
- directing the WDM signal to a dispersion compensating element;
- substantially compensating the WDM optical signal for dispersion that has accumulated along an external transmission path;
- directing the dispersion compensated WDM optical signal to an external element,
- wherein said prescribed level below which the total power of the WDM optical signal is to be maintained is sufficient to substantially avoid non-linear interactions in the dispersion compensating element, and
- wherein said step of maintaining a total power of the WDM signal below a prescribed level comprises determining the total number of channels and the total power in said WDM optical signal.

13. The method of claim 12, wherein said prescribed level corresponds to a prescribed power level per channel.

14. A method for providing dispersion compensation to a WDM optical signal, said method comprising the steps of:
- receiving the WDM optical signal;
- maintaining a total power of the WDM signal below a prescribed level;
- directing the WDM signal to a dispersion compensating element;
- substantially compensating the WDM optical signal for dispersion that has accumulated along an external transmission path;
- directing the dispersion compensated WDM optical signal to an external element,
- wherein the power maintaining step comprises the step of attenuating the WDM optical signal at a point intermediate to the input port and the dispersion compensating element, and
- determining the total number of channels and the total power in said WDM optical signal.

15. The method of claim 14, wherein the attenuating step comprises the step of determining a level of attenuation to be provided to the WDM optical signal based on a measured power level of the WDM optical signal.

16. The method of claim 15, wherein the determining step is accomplished in accordance with an open loop configuration.

17. The method of claim 15, wherein the determining step is accomplished in accordance with a closed loop configuration.

18. The method of claim 15, wherein the determining step is accomplished in accordance with a feedback loop configuration.

* * * * *

UNITED STATES PATENT AND TRADEMARK OFFICE
CERTIFICATE OF CORRECTION

PATENT NO. : 7,369,777 B2 Page 1 of 1
APPLICATION NO. : 10/718073
DATED : May 6, 2008
INVENTOR(S) : Jasti et al.

It is certified that error appears in the above-identified patent and that said Letters Patent is hereby corrected as shown below:

In Column 5, Line 3, please delete "db/wavelength." and insert --dBm/wavelength.--

Signed and Sealed this

Eighth Day of September, 2009

David J. Kappos
*Director of the United States Patent and Trademark Office*